Nov. 12, 1957 W. KOCH 2,812,631
PIVOTED BLADE CONTROL MECHANISM FOR LAWN EDGE TRIMMER
Filed July 19, 1954 2 Sheets-Sheet 1
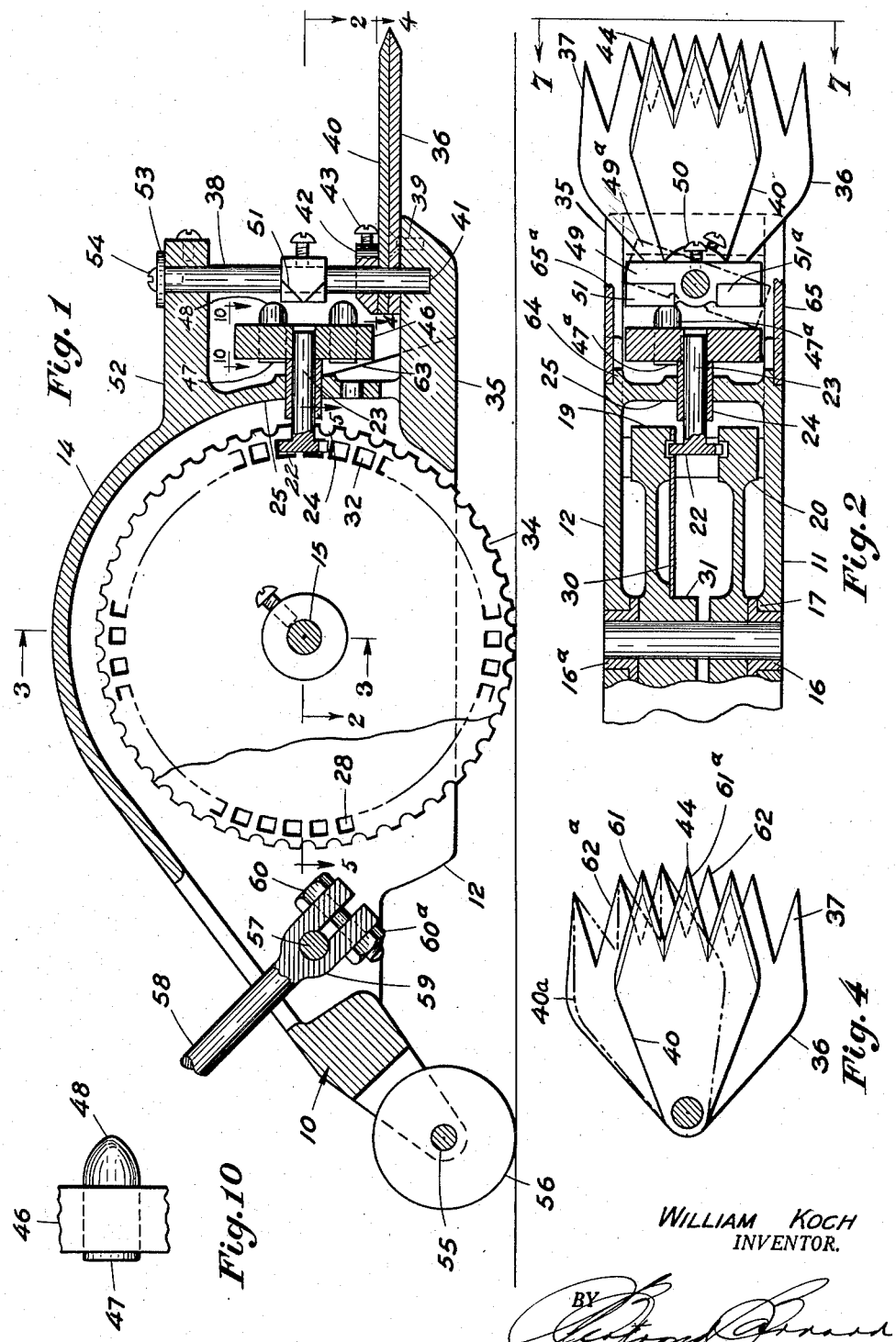
WILLIAM KOCH
INVENTOR.
BY
ATTORNEY Nov. 12, 1957  W. KOCH  2,812,631
PIVOTED BLADE CONTROL MECHANISM FOR LAWN EDGE TRIMMER
Filed July 19, 1954  2 Sheets-Sheet 2

WILLIAM KOCH
INVENTOR.

BY
ATTORNEY

United States Patent Office 2,812,631
Patented Nov. 12, 1957

2,812,631

PIVOTED BLADE CONTROL MECHANISM FOR LAWN EDGE TRIMMER

William Koch, Whitestone, N. Y.

Application July 19, 1954, Serial No. 444,301

9 Claims. (Cl. 56—246)

This invention relates to a shearing apparatus and is particularly directed to a device used in trimming the grass at the edges or in irregular contours of lawns and the like.

It is primarily directed to an apparatus, which is small, compact and can be wheeled along the ground and readily maneuvered in relatively close quarters, so that the shear blades, can be utilized for trimming grass plots or lawns of irregular contour, the device being particularly suitable for use in narrow areas or spaces of irregular contour, in which the conventional type of lawn mower cannot be conveniently used.

A primary feature of applicant's apparatus resides in the combination in a lawn trimmer of a fixed blade, an oscillating blade pivotally mounted in engagement with the fixed blade, and means controlled by the driving wheels of the apparatus for oscillating the pivoted blade relative to the fixed blade.

The primary object of the invention is to provide a driving mechanism for the oscillating blade of a shearing apparatus, comprising a pivoted rocking lever connected by a shaft to the oscillating blade, and a disc mounted susbtantially perpendicularly to the rocking lever, the disc having an odd number of radially positioned pins projecting beyond the forward face thereof, the pins progressively and alternately engaging integral cam followers located on opposite ends of the rocking lever to impart a rocking motion thereto.

A further object is to provide a simple, compact apparatus for rocking the oscillating blade of a shear device from the drive wheels thereof, an essential feature of the drive means residing in the incorporation of a driving disc having a plurality of radially positioned pins projecting perpendicularly therefrom, the pins progressively engaging cam followers located at opposite ends of a rocking lever attached to the oscillating blade to impart the oscillating motion thereto.

Another feature of the apparatus is the mechanism for driving a pivoted shear blade, the oscillating mechanism comprising a pivoted rocking lever attached to the oscillating blade, the pivoted rocking lever having a pair of cam followers at the ends thereof, in cooperation with a disc mounted substantially perpendicularly to the pivoted rocking lever, the disc being driven by the driving wheels of the apparatus, the disc having a pluarlity of radially positioned pins projecting perpendicularly from one face thereof.

Another object is to provide a relatively simple, easily maneuverable lawn edge trimmer unit, which is small, compact, light in weight and can be readily utilized and maneuvered in irregular and narrow areas, the driving wheels of the apparatus controlling the oscillation of a pivoted shear blade mounted in engagement with a fixed blade having a plurality of radially positioned V-teeth formed therein.

A major feature of applicant's apparatus is the combination of a fixed shear blade having radial V-teeth at one end thereof, and an oscillating shear blade mounted in engagement therewith, the oscillating shear blade being driven by a rocking lever, the rocking motion of which is imparted thereto by a rotating disc having a plurality of radially positioned pins projecting from one face thereof.

Another object is to provide an apparatus for driving a pivoted shear blade, including a pivoted rocking lever attached to the oscillating blade, a plurality of pins projecting perpendicularly from a circular disc for alternately angularly displacing the rocking lever, and a pinion having a plurality of radially projecting teeth, or pins driven by a driving wheel, or a combination of a driving wheel and a drive plate having mating cavities therein for driving the pinion.

Another object is to provide a simple, compact unit for use as a lawn edge trimmer, the apparatus being simple, readily controlled and operated by persons having no special skills or experience, the parts of the unit driving the oscillating blade being easily controlled and adjusted by persons having little special skills or experience, the apparatus maintaining its operating characteristics over a sustained period with very little handling or adjustment during prolonged periods of operation.

The accompanying drawings, illustrative of one embodiment of my invention, and several minor modifications thereof, together with the description of their construction and the method of operation and utilization thereof, will serve to clarify further objects and advantages of the invention.

In the drawings:

Fig. 1 represents a vertical section through the longitudinal center line of the assembled unit, showing the relation between the outer housing, the drive wheels, the grooved circumferential outer surface of which engages the ground, and the rear guide wheel, the outer surface of which is level with the outer circumference of the drive wheel, the drive pinion, the pin support control disc, the rocking lever, the fixed blade, and the oscillating blade fitted thereto.

Fig. 2 is a section through the forward portion of the assembled unit, shown in Fig. 1, showing the relative position of the drive wheels and the drive plate, the drive pinion, the rocking lever, and the rocking lever control disc, taken at 2—2, Fig. 1, with the rocking lever moved to one extreme angular position, shown by dot-dash lines.

Fig. 4 is a plan view of the forward portion of the unit, shown in Figs. 1 and 2, showing the relative positions of the fixed blade and the oscillating blade, with the oscillating blade moved to one extreme angular position, shown by dot-dash lines, the view being taken on a line 4—4, parallel to line 2—2, Fig. 1.

Figure 5:
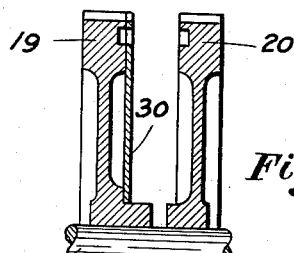

Fig. 5 is a horizontal section through the drive wheels, the drive plate and the drive pinion, shown in Figs. 1 and 2, the section being taken on a horizontal line through the horizontal centerline of the wheel, designated as 5—5, Fig. 1.

Figure 6:
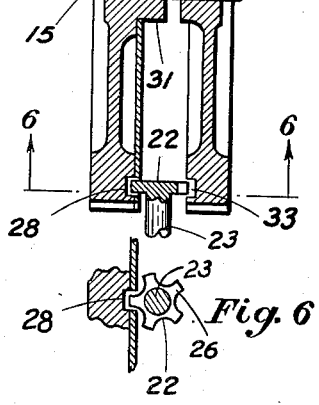

Fig. 6 is a cross-section through the drive pinion, the drive wheel and the drive plate, shown in Figs. 1, 2 and 5, taken at 6—6, Fig. 5.

Figure 7:
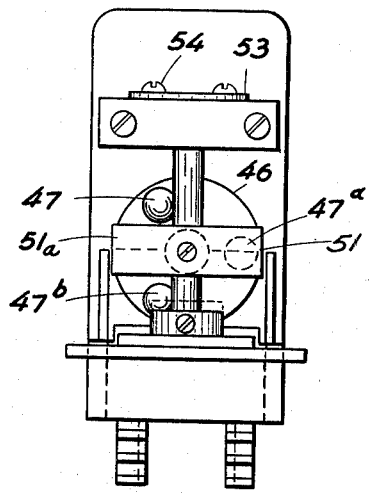

Fig. 7 is a front elevation of the assembled apparatus, shown in Figs. 1 and 2, with the cover removed, taken at 7—7, Fig. 2.

Figure 8:
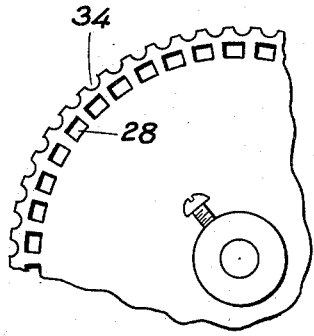

Fig. 8 is a fragmentary side elevation of the inner face of a portion of the drive wheel, shown in Figs. 1, 2 and 5.

Figure 9:
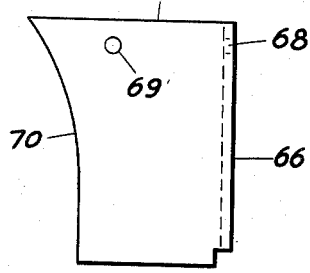

Fig. 9 is a side elevation of the cover attached to the front end of the housing, shown in Figs. 1 and 2.

Fig. 10 is a fragmentary plan view of a portion of the rotating disc shown in Fig. 1, and one of the pins inserted therethrough, taken on the line 10—10, Fig. 1.

It will be understood that the following description of the construction and the method of operation and utilization of the pivoted blade control mechanism for lawn edge trimmer is intended as explanatory of the invention and not restrictive thereof.

Figure 3:
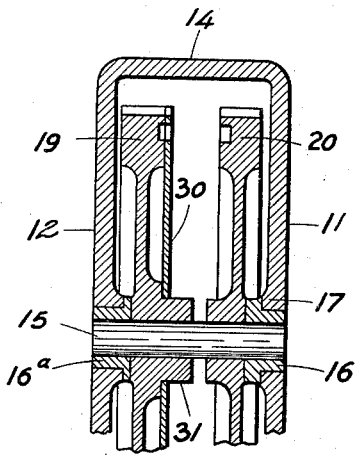
Fig. 3 is a vertical section through the outer housing, the drive wheel, the drive plate and the auxiliary wheel, shown in Fig. 1, taken at 3—3, Fig. 1.

One embodiment of the construction, shown in Figs. 1, 2 and 3, is supported by a hollow housing designated by the general reference numeral 10 the housing having a pair of integral substantially parallel side walls 11 and 12, the upper portion of which is of substantially circular segmental outer contour, the rear portion of each side wall sloping outward toward the bottom, a major portion of the bottom of the housing being open.

The top wall 14 of the housing, connecting the side walls, which follows the outer contour of the housing side walls 11 and 12, is integral with the side walls.

A substantially cylindrical shaft 15 is rotatably supported by a pair of shouldered bushings 16 and 16a pressed into or otherwise fitted to bosses 17 formed in the housing side walls 11 and 12, as shown in Figs. 2 and 3. A pair of wheels 19 and 20, the hub of each of which is attached to the cylindrical shaft 15, is mounted in the interior of the housing 10, each wheel 19 or 20 being located adjacent the respective housing side wall 11 or 12, leaving a relatively wide space between the drive wheels at the center of the housing.

A blade drive pinion 22 comprising a central hub, integral with, or attached to a substantially horizontal shaft 23 rotatably supported by a bushing 24, pressed into or otherwise attached to the forward wall 25 of the housing 10, and a plurality of radially projecting teeth 26 of square or other suitable cross-section, is mounted between the wheels 19 and 20 near the outer rim thereof.

The drive wheel 19 located at one side of the housing 10, has a plurality of equally-spaced radially positioned cavities 28 cut into the inner face thereof, as indicated in Figs. 1 and 8, the center spacing between the cavities 28 being substantially equal to the circumferential spacing between the pinion teeth 26.

A thin steel drive plate 30 is mounted adjacent the inner face of the drive wheel 19, the drive plate being supported by a substantially cylindrical hub 31 formed at the center of the drive wheel 19. The steel plate has a plurality of radially positioned square, or other form of slots 32 conforming to the contour of the drive pinion teeth, the slots being in substantial alignment with the cavities 28 in the inner face of the drive wheel 19, the center spacing between the slots being substantially equal to the circumferential spacing between the drive pinion teeth 26. The teeth 26 of the pinion progressively fitting into the slots 32 in the drive plate and the corresponding cavities 28 in the drive wheel 19, thereby rotating the drive pinion 22, when the drive wheel 19 is rolled along the ground, the edges of the slots in the drive plate and the cavities in the drive wheel engaging the mating edges of the pinion teeth, in substantially the same manner as the operation of a gear train. The opposite or auxiliary wheel 20 has a circular groove 33 of substantially rectangular cross-section cut into the inner face thereof, the groove 33 being in substantially radial alignment with the radially positioned slots in the drive plate and the corresponding cavities 28 in the drive wheel 19, thus allowing the drive pinion 22 to rotate freely, the pinion teeth clearing the groove 33.

A series of grooves 34 of semi-circular or other arcuate cross-sectional contour, is cut around the outer circumference of each wheel 19 and 20 to facilitate traction when the wheels 19 and 20 are rolled along the ground.

A substantially horizontal forward bottom shelf 35 extending beyond the forward wall 25 of the housing 10 is integral with or attached to the lower end of the forward portion of the side walls 11 and 12 of the housing, adjacent the bottom thereof, the bottom shelf being located between and integral with the housing side walls 11 and 12 in the manner shown in Fig. 3. A fixed blade 36 comprising a flat steel plate having a plurality of radially positioned V-teeth 37 cut substantially radially around the forward edge thereof, is attached to the forward bottom shelf 35 of the housing by a plurality of screws 39, or other suitable attaching means, the fixed blade 36 projecting forwardly of the housing forward wall, in the position shown in Figs. 1 and 2. The teeth of the fixed blade are located substantially radially about the center line of a substantially vertically disposed and horizontally oscillating shaft 38, located in front of the forward wall 25 of the housing, adjacent the lower end of which shaft an oscillating blade 40 is mounted, the oscillating blade being pressed on, or otherwise attached to the oscillating shaft 38. The lower end of the oscillating shaft fits through an opening in the fixed blade 36, the bottom of the shaft being trunnioned in a cylindrical cavity 41 formed in the bottom shelf 35, as shown in Fig. 1.

The oscillating blade 40 is mounted above the fixed blade and in engagement with the upper face thereof. A collar 42 is pressed on or otherwise attached to the oscillating shaft 38, a set screw 43 threadably fitted to the collar positively locating the oscillating blade and the oscillating shaft 38 which it is attached, relative to the fixed blade 36. The oscillating blade has a smaller number of V-teeth 44 cut radially around the forward edge thereof, the V-teeth 44 of the oscillating blade 40 being radially positioned about the center of the vertical oscillating shaft 38, the circumferential spacing between the V-teeth 44 in the oscillating blade 40 being substantially equal to that of the teeth in the fixed blade 36, thus facilitating the shearing action of the blade teeth, when the oscillating blade 40 is moved from one extreme angular position 40a, shown by dot-dash lines, Fig. 4, to the opposite extreme angular position, by a blade rocking mechanism hereinafter described in greater detail.

A substantially circular disc 46 is attached to the front end of the pinion shaft 23, in front of the forward wall 25 of the housing, the disc having an odd number of equally-spaced radially positioned pins 47 located around the circumference thereof, the pins 47 projecting beyond the forward face of the disc 46 in the manner shown in Figs. 1 and 2. While three pins 47, 47a and 47b are shown in Fig. 7, the pins being spaced 120° apart about the pinion shaft center. The outer tip 48 of each of the pins 47, 47a and 47b attached to the disc 46 is of arcuate frusto-conical, or other suitable contour to facilitate engagement with the cam surfaces of a rocking lever 49, which the pins actuate.

The point of the frusto-conical end of each pin may be rounded, a radius being formed at the junction between the cylindrical body of the pins and the sloping arcuate sides of the tip thereof, as shown in Fig. 10.

In place of the frusto-conical contour of the tip of the pin, shown in Figs. 1, 2, and 10, the tips may be substantially hemispherical or of other suitable contour to facilitate engagement with the cam follower of the rocking lever 49.

A rocking lever 49 is attached to the vertically mounted oscillating shaft 38, an opening in the hub at the center of the rocking lever being fitted to the oscillating shaft, the center of the rocking lever being in substantial alignment with the longitudinal center line of the disc 46, as indicated in Fig. 1.

A set screw 50, or other suitable type of locking means is threadably fitted to the hub of the rocking lever, the point of the set screw pressing against the outer surface of the oscillating shaft to accurately positin the rocking lever relative to the oscillating shaft in the manner shown in Figs. 1 and 2.

A pair of V-shaped, or other suitable form of cam followers 51 and 51a having sloping sides, is formed integral with, or attached to the outer ends of the rocking lever, the spacing between the cam followers 51 and 51a, and the center of the rocking lever being substantially equal to the radial spacing between the pins 47 and the longitudinal center of the disc 46 to facilitate engagement of the tips of the pins against the sloping surfaces of the cam followers of the rocking lever, in the manner shown in Figs. 2 and 7.

When the disc 46 is rotated, one of the pins 47a engages the cam follower 51 at one end of the rocking lever 49, thereby canting the rocking lever to the angular position 49a, shown in dot-dash lines, Fig. 2, the vertical oscillating shaft thereby moving the oscillating blade to one of the extreme angular positions, shown by dot-dash lines, in Fig. 4.

As the rotation of the disc 46 is continued, the second pin 47b, Fig. 7, engages the opposite cam follower 51a of the rocking lever 49, thereby tilting the rocking lever to an angular position opposite that shown by dot-dash lines, Fig. 2, the oscillating blade 40 being moved to the oppostie extreme position by the vertical oscillating shaft 38.

The oscillating movement of the blade 40 continues as long as the drive wheels 19 and 20 are rotated, while the apparatus is in motion. An upper shelf 52 is formed integral with, or attached to the forward wall 25 of the housing, the upper shelf being located forwardly of the housing wall, above the fixed blade 36.

An opening through the upper shelf 52 in alignment with the vertical oscillating shaft 38, into which the upper end of the oscillating shaft 38 is fitted, rotatably supports the oscillating shaft in alignment with the pivot opening through the oscillating blade and the oscillating shaft trunnion cavity 41 in the bottom shelf 35.

A thin metal plate 53 located adjacent the upper edge of the upper shelf of the housing, engages the upper end of the oscillating shaft 38, thereby retaining the oscillating shaft in the position shown in Fig. 2, and vertically aligning the oscillating shaft relative to the housing 10.

The thin plate 53 is attached to the upper shelf 52 of the housing by a plurality of screws 54, or other suitable attaching means, threadably fitted to the upper shelf, as indicated in Figs. 1 and 7.

An open channel of rectangular cross-section is cut through the rear end of the solid section of the housing, adjacent the bottom thereof, a cylindrical axle 55 being pressed into, or otherwise attached to the walls of the housing adjacent the channel. A substantially cylindrical wheel 56 is rotatably fitted to the axle 55, within the housing slot, the circumferential lower edge of the wheel being in substantial alignment with the outer circumference of the drive wheels 19 and 20 to retain the housing substantially parallel to the ground level during the operation of the shearing apparatus.

A cylindrical shaft 57 is rotably supported by openings formed in the side walls 11 and 12 of the housing 10, behind the centerline of the housing side walls, in substantially the position shown in Fig. 1. A long control rod 58, having a support hub 59 located at the lower end thereof, is attached to the cylindrical shaft 57, an opening in the center of the hub 59 being fitted over the cylindrical shaft 57 to clamp the support hub to the shaft 57. The lower end of the support hub of the control rod is slotted as indicated in Fig. 1, a bolt or screw 60, fitted through openings in the two sections of the support hub 59 and clamped thereto by a nut 60a, threadably fitted to the bolt 60, or the screw may be threadably inserted in one side of the support hub adjacent the slot therethrough, the bolt 60 clamping the two sections of the support hub 59 against the shaft 57, thereby tightly gripping the cylindrical shaft.

A control handle, or knob, is attached to the opposite end of the control rod 58 to facilitate gripping the control rod in order to maneuver the lawn edge trimmer apparatus along the ground.

The edges 61 and 61a of the V-teeth 44 of the oscillating blade 40 are bevelled, as indicated in Fig. 4, to facilitate the shearing action of the blade teeth, when one edge of each of the teeth of the oscillating blade passes the co-operating opposite edge of each of the teeth 37 in the fixed blade, thereby performing the shearing operation.

As the oscillating blade 40 is moved from the central position, shown in Fig. 4, to the extreme position, shown by dot-dash lines, Fig. 4, the shearing edge 61 of each of the V-teeth 44 of the oscillating blade 40, located in the direction in which the oscillating blade is moved, travels across the opposite edge 62 of the corresponding V-tooth of the fixed blade, thereby shearing the blades of grass, or other material located in the path of the blade teeth to a relatively uniform height, corresponding ot the height between the bottom of the wheels 19 and 20 and the upper surface of the fixed blade 36.

When the oscillating blade is moved in the opposite direction in the manner hereinbefore described, the shearing edge 61a of each V-tooth in the oscillating blade, located in the direction of movement of the oscillating blade, performs the shearing operation, as the shearing edge 61a of each of the oscillating blade teeth passes the opposite edge 62a of each of the teeth in the fixed blade, the shearing action being substantially the same as when the oscillating blade is moved in the opposite direction, except that the shearing action is performed by the opposite edge of the V-teeth 44 of the oscillating blade and the teeth of the fixed blade 36 respectively.

When the apparatus is moved rearward, the direction of rotation of the drive wheels 19 and 20 is reversed, thereby reversing the rotation of the blade drive pinion 22 and the disc 46 attached thereto.

The oscillating blade 40 connected by the vertical oscillating shaft 38 to the rocking lever, is therefore oscillated over the same angular range as in forward motion, although the sequence of angular movement is reversed.

As indicated in Fig. 1, a side wall extension 63 is integral with the front end of each side wall 11 and 12, beyond the forward wall of the housing, each side wall extension, which has a sloping forward edge, as indicated in Fig. 1, being integral with the forward wall and the adjacent side of the bottom shelf 35 of the housing respectively.

Each side wall extension is cut back a distance substantially equal to the thickness of the wall of a cover fitted to the front end of the housing to form a ledge 64, which receives and supports the adjacent side wall 65 of a cover mounted in front of the forward wall of the housing, to cover the oscillating mechanism. The cover which fits over the operating mechanism located beyond the forward wall 25 of the housing 10, comprises a pair of side walls 65 and 65a following substantially the contour of the ledges 64 integral with the housing side wall extensions 63, and a forward wall 66 integral with and connecting the side walls 65 and 65a of the cover respectively.

The upper and lower edges of the cover are open, the upper shelf 52 and the bottom shelf 35 of the housing, which are in substantial alignment with the upper and lower edges of the forward portion of the housing side walls 11 and 12 respectively, coacting with the cover to enclose the forward end of the apparatus.

The forward wall of the cover shuts the front end of the upper shelf of the housing 10, one or more screws fitting through openings 68 in the housing forward wall, as indicated in Fig. 9, being provided to attach the cover to the housing.

Similar openings 69 are provided in the side walls 65 and 65a of the cover, to receive screws threadably fitted to the edges of the housing upper shelf to clamp the cover to the upper shelf of the housing.

The rear edge 70 of each side wall of the cover is shaped along an arcuate line, conforming substantially to the outer contour of the forward wall of the housing to form a closure between the cover and the front end of the housing.

The operation of the unit is substantially as follows:

The apparatus is manually wheeled along the ground by means of the control rod 53, the grooves around the outer circumference of the drive wheels providing traction along the ground.

The contour of the tips of the pins may be varied, the pins being of substantially arcuate frusto conical form, as shown in the drawings, Fig. 10, or of hemispherical or other arcuate cross-sectional contour, the action of pins in engaging the rocking lever cam followers remaining substantially the same.

It will be apparent to those skilled in the art that my present invention is not limited to the specific details described above and shown in the drawings, and that various modifications are possible in carrying out the features of the invention and the operation, actuation, and the method of utilization and maneuvering thereof, without departing from the spirit and scope of the appended claims.

What I claim is:

1. A shearing apparatus including a hollow housing, a drive pinion trunnioned in one end of said housing, a substantially cylindrical control member attached to said drive pinion in axial alignment therewith, a pair of rotating drive wheels mounted substantially perpendicularly to the drive pinion operative to rotate the pinion, a plurality of cylindrical pins located substantially parallel to the control member longitudinal axis projecting beyond one face of the control member, said pins being equidistant from the control member longitudinal axis and equally spaced relative to one another, a rocking member mounted in substantial alignment with the longitudinal control member axis, said rocking member being oscillatable in a plane perpendicular to the face of the control member, means rotatably supporting the rocking member, said rocking member having ends of substantially V-cross-section operative to successively engage the projecting end of the pins, to oscillate the rocking member, a fixed shear blade having a plurality of shearing edges thereon attached to the housing, and an oscillating shear blade operatively connected to the rocking member in operative engagement with the fixed shear blade.

2. A shearing apparatus comprising a housing, a pair of wheels rotatably supported by said housing, a drive pinion trunnioned in said housing, a plurality of radial cavities in one of said wheels operative to rotate the drive pinion, a substantially cylindrical member attached to the drive pinion, a plurality of pins attached to said cylindrical member, said pins being radially positioned substantially parallel to the longitudinal cylindrical member axis, one end of said pins projecting beyond one face of the cylindrical member, a shaft rotatably supported by the housing, in substantial alignment with the cylindrical member longitudinal axis and substantially perpendicular thereto, a rocking lever attached to said shaft in substantial alignment with the cylindrical member longitudinal axis, said rocking member having integral followers adjacent the outer ends thereof, said followers being located a distance substantially equal to the radial distance of each of the pins from the longitudinal cylindrical member axis, a fixed shear blade supported by the housing in a position substantially perpendicular to the longitudinal shaft axis, and an oscillating shear blade attached to the shaft in operative engagement with the fixed shear blade.

3. In a lawn edge trimmer, the combination of a hollow housing, a pair of ground engaging drive wheels rotatably supported by said housing, including a first and a second drive wheel, a drive pinion trunnioned in one end of said housing in operative alignment with the first of said ground engaging drive wheels, a plurality of radial cavities in the first ground engaging drive wheel operative to rotate the drive pinion, a substantially cylindrical control disc attached to the drive pinion in axial alignment therewith, an odd number of substantially cylindrical pins located substantially parallel to the longitudinal control disc axis projecting beyond one face of the control disc, said pins being equidistant from the longitudinal control disc axis and equally spaced relative to one another, the projecting tip of each of said control disc pins being of arcuate cross-sectional contour, a rocking lever in substantial alignment with the longitudinal control disc axis, said rocking lever being oscillatable in a plane perpendicular to the control disc face, means operative to rotatably support the rocking lever, said rocking lever having integral cam followers adjacent the ends thereof, said cam followers being operative to successively engage the projecting end of the control disc pins to oscillate the rocking lever, a fixed shear blade having a plurality of shearing edges at one end thereof attached to the housing in a plane parallel to the plane of movement of the rocking lever, and an oscillating shear blade operatively connected to the rocking lever, in operative engagement with the fixed shear blade, said oscillating shear blade having a plurality of shearing edges at one end thereof operative to coact with the fixed blade shearing edges.

4. A shearing apparatus including a hollow housing, a drive pinion trunnioned in one end of said housing, a substantially cylindrical control disc attached to said drive pinion in axial alignment therewith, a pair of rotating drive wheels mounted substantially perpendicularly to the drive pinion operative to rotate the pinion, a plurality of substantially cylindrical pins located substantially parallel to the control disc axis of rotation, projecting beyond one face of the control disc, said pins being equidistant from the control disc longitudinal axis and equally spaced relative to one another, an oscillating shaft rotatably supported by the housing in substantial alignment with the control disc axis of rotation, the oscillating shaft axis being substantially perpendicular to the longitudinal control disc axis, a rocking member attached to the oscillating shaft in substantial alignment with the control disc axis of rotation, a substantially V-shaped cam follower integral with each end of said rocking member, the spacing of each of said cam followers relative to the oscillating shaft axis being substantially equal to the radial distance of each of the pins from the control disc axis of rotation, a fixed shear blade attached to the housing in a position substantially perpendicular to the oscillating shaft axis, said fixed shear blade having a plurality of V-teeth at one end thereof, and an oscillating shear blade attached to the oscillating shaft in operative engagement with the fixed shear blade, said oscillating shear blade having a plurality of radially positioned V-teeth at the outer end thereof, the oscillating blade V-teeth being located in operative alignment with the fixed blade V-teeth.

5. In a lawn edge trimmer, the combination of a housing, a shaft trunnioned in said housing, a pair of ground engaging drive wheels mounted on said shaft, including a first and a second drive wheel, a substantially circular drive plate mounted adjacent the first of said wheels, the first of said ground engaging drive wheels having a plurality of equally-spaced radially positioned cavities in one face thereof, the circular drive plate having a plurality of radially positioned slots therethrough in alignment with the wheel cavities, a drive pinion trunnioned in one end of said housing, the drive pinion having a plurality of integral radially positioned teeth, the pinion teeth meshing with the wheel cavities and the drive plate slots to rotate the pinion, a substantially cylindrical control disc attached to the drive pinion in axial alignment therewith, an odd number of substantially cylindrical pins located substantially parallel to the control disc axis of rotation projecting beyond one face of the control disc, said pins being equidistant from the control disc axis of rotation and equally spaced relative to one another, an oscillating shaft trunnioned in the housing in substantial alignment with the control disc axis of rotation, the oscillating shaft axis being substantially perpendicular to the control disc axis of rotation, a rocking lever attached to the oscillating shaft in substantial alignment with the control disc axis of rotation, a cam follower integral with each end of the rocking lever, the spacing of each of said cam followers relative to the oscillating shaft axis being substantially equal to the radial spacing of each of the control disc pins relative to the control disc axis of rotation, a fixed shear blade attached to the housing substantially perpendicularly to the oscillating shaft axis, said fixed shear blade having a plurality of V-teeth at one end thereof, and an oscillating shear blade attached to the oscillating shaft in operative engagement with the fixed shear blade, said oscillating shear blade having a plurality of radially positioned V-teeth at the outer end thereof, the oscillating blade V-teeth being located in operative alignment with the fixed shear blade V-teeth.

6. A lawn edge trimmer comprising a housing, a pair of ground engaging drive wheels trunnioned in said housing, including a first and a second drive wheel, a substantially circular drive plate attached to the first of said ground engaging drive wheels adjacent one face thereof, said first wheel having a plurality of equally-spaced radially positioned cavities in one face thereof, the circular drive plate having a plurality of mating slots therethrough in alignment with the wheel cavities, a drive pinion trunnioned in the front end of said housing, the drive pinion having a plurality of radially projecting teeth integral therewith, the circumferential spacing of the wheel cavities and the drive plate slots being substantially equal to the spacing between the outer ends of the drive pinion teeth, said drive pinion teeth being operative to mesh with the wheel cavities and the drive plate slots to rotate the drive pinion, a substantially cylindrical control disc attached to the drive pinion in axial alignment therewith, an odd number of substantially cylindrical pins located substantially parallel to the longitudinal disc axis attached to the control disc, said pins projecting beyond one face of the disc, the tip of the projecting end of each of said pins being of substantially frusto-conical contour, said pins being equidistant from the control disc longitudinal axis and equally spaced relative to one another, said housing having an integral bottom shelf and an upper shelf projecting beyond the forward end thereof, said upper and bottom shelf being substantially perpendicular to the face of the first ground engaging drive wheel, an oscillating shaft trunnioned in the bottom shelf and the upper shelf of said housing, in substantial alignment with the control disc longitudinal axis, the oscillating shaft being substantially perpendicular to the upper and the bottom shelf, a rocking lever attached to the oscillating shaft in substantial alignment with the longitudinal control disc axis, a substantially V-shaped cam follower integral with each end of the rocking lever, the spacing of each of said cam followers relative to the longitudinal oscillating shaft axis being substantially equal to the radial spacing of each of the control disc pins relative to the longitudinal control disc axis, a fixed shear blade attached to the housing bottom shelf, said fixed shear blade having a plurality of V-teeth at one end thereof, and an oscillating shear blade attached to the oscillating shaft, in operative engagement with the fixed shear blade, said oscillating shear blade having a plurality of radially positioned V-teeth at the outer end thereof, the V-teeth being located in operative alignment with the fixed shear blade V-teeth.

7. A lawn edge trimmer comprising a housing having a pair of side walls and a front end wall integral therewith, a bushing fitted to each of said housing side walls, the bushings being in substantial alignment with one another, a substantially cylindrical shaft trunnioned in said bushings, a ground engaging drive wheel attached to said cylindrical shaft, a substantially circular drive plate attached to the drive wheel adjacent one face thereof, the drive wheel having a plurality of equally-spaced radially positioned cavities in the face engaging the drive plate, the circular drive plate having a plurality of mating slots therethrough, in alignment with the drive wheel cavities, a bushing fitted through the front wall of the housing in substantial alignment with the drive wheel shaft axis, the bushing being substantially perpendicular to the drive wheel shaft, a drive pinion having a support shaft integral therewith mounted adjacent the housing front wall, the pinion support shaft being trunnioned in the housing front wall bushing, the pinion having a plurality of radially projecting teeth integral therewith, the circumferential spacing of the drive wheel cavities and the drive plate slots being substantially equal to the spacing between the outer ends of the drive pinion teeth, said drive wheel cavities and drive plate slots progressively engaging the drive pinion teeth to rotate the drive pinion, a substantially cylindrical control disc attached to the drive pinion support shaft, a plurality of substantially cylindrical pins substantially parallel to the control disc longitudinal axis attached to the control disc, said pins projecting beyond one face of the control disc, the tip of the projecting end of each of said pins being of arcuate cross-sectional contour, said pins being equidistant from the longitudinal control disc axis and equally spaced relative to one another, an oscillating shaft trunnioned in the housing, in substantial alignment with the longitudinal control disc axis, the longitudinal oscillating shaft axis being substantially parallel to the drive wheel face, a rocking lever attached to the oscillating shaft in substantial alignment with the longitudinal control disc axis, a substantially V-shaped cam follower integral with each end of the rocking lever, the spacing between each of said cam followers and the longitudinal oscillating shaft axis being substantially equal to the radial spacing between each control disc pin and the longitudinal control disc axis, a fixed shear blade attached to the housing, in a plane perpendicular to the longitudinal oscillating shaft axis, said fixed shear blade having a plurality of radially positioned V-teeth at the outer end thereof, and an oscillating shear blade attached to the oscillating shaft in operative engagement with the fixed shear blade, said oscillating shear blade having a plurality of radially positioned V-teeth at the outer end thereof, the oscillating blade V-teeth being in operative alignment with the fixed shear blade V-teeth.

8. A lawn edge trimmer comprising a housing, a pair of ground engaging wheels trunnioned in said housing, a substantially circular plate attached to the first of said wheels adjacent one face thereof, said first wheel having a plurality of equally-spaced radially positioned cavities in one face thereof, the circular drive plate having a plurality of mating slots therethrough in alignment with the wheel cavities, a drive pinion trunnioned in the front end of said housing, the drive pinion having a plurality of radially projecting teeth integral therewith, the circumferential spacing of the wheel cavities and the drive plate slots being substantially equal to the spacing between the outer ends of the drive pinion teeth, said drive pinion teeth being operative to mesh with the wheel cavities and the drive plate slots to rotate the drive pinion, a substantially cylindrical control disc attached to the drive pinion in axial alignment therewith, a set of three substantially cylindrical pins, located substantially parallel to the longitudinal control disc axis attached to the control disc, said pins projecting beyond one face of the control disc, said pins being equally spaced radially relative to the longitudinal control disc axis, the tip of the projecting end of each of said pins being of substantially arcuate frusto-conical contour, with a radius formed at the outer end of each of said tips, an oscillating shaft trunnioned in said housing in substantial alignment with the longitudinal control disc axis, the longitudinal oscillating shaft axis being substantially parallel to the face of the first wheel, a rocking lever attached to the oscillating shaft in substantial alignment with the longitudinal control disc axis, a substantially V-shaped cam follower integral with each end of the rocking lever, the spacing of each of said cam followers relative to the longitudinal oscillating shaft axis being substantially equal to the radial spacing of each of the control disc pins relative to the longitudinal control disc axis, a fixed shear blade attacehd to the housing in a plane substantially perpendicular to the longitudinal oscillating shaft axis, said fixed shear blade having a plurality of radially positioned V-teeth at one end thereof, and an oscillating shear blade attached to the oscillating shaft in operative abutment with the fixed shear blade, said oscillating shear blade having a plurality of radially positioned V-teeth at the outer end thereof, the oscillating blade V-teeth being located in operative alignment with the fixed shear blade V-teeth.

9. A lawn edge trimmer comprising a housing having a pair of side walls and a front end wall integral therewith, a bushing fitted to each of said housing side walls, the bushings being in substantial alignment with one another, a substantially cylindrical shaft trunnioned in said bushings, a ground engaging drive wheel attached to said cylindrical shaft, a substantially circular drive plate attached to the drive wheel adjacent one face thereof, the drive wheel having a plurality of equally spaced radially positioned cavities in the face thereof engaging the drive plate, the circular drive plate having a plurality of mating slots therethrough in alignment with the drive wheel cavities, a bushing fitted through the housing front wall in substantial alignment with the longitudinal drive wheel shaft axis, the bushing being substantially perpendicular to the drive wheel shaft, a drive pinion having a support shaft integral therewith mounted adjacent the housing front wall, the drive pinion support shaft being trunnioned in the housing front wall bushing, the drive pinion having a plurality of radially projecting teeth integral therewith, the circumferential spacing of the drive wheel cavities and the drive plate slots being substantially equal to the spacing between the outer ends of the drive pinion teeth, said drive wheel cavities and drive plate slots being operative to rotate the drive pinion, a substantially cylindrical control disc attached to the drive pinion support shaft, a set of three substantially cylindrical pins substantially parallel to the longitudinal control disc axis attached to the control disc, said pins projecting beyond one face of the control disc, the tip of the projecting end of each of said pins being of arcuate cross-sectional contour, said pins being equidistant from the longitudinal control disc axis and equally spaced relative to one another, an oscillating shaft trunnioned in the housing in substantial alignment with the longitudinal control disc axis, the longitudinal oscillating shaft axis being substantially parallel to the drive wheel face, a rocking lever attached to the oscillating shaft in substantial alignment with the longitudinal control disc axis, a substantially V-shaped cam follower integral with each end of the rocking lever, the spacing between each of said cam followers and the oscillating shaft longitudinal axis being substantially equal to the radial spacing between each control disc pin and the longitudinal control disc axis, a fixed shear blade attached to the housing in a plane perpendicular to the longitudinal oscillating shaft axis, said fixed shear blade having a plurality of radially positioned V-teeth at the outer end thereof, and an oscillating shear blade attached to the oscillating shaft in operative engagement with the fixed shear blade, said oscillating shear blade having plurality of radially positioned V-teeth at the outer end thereof, the oscillating blade V-teeth being in operative alignment with the fixed shear blade V-teeth.

References Cited in the file of this patent

UNITED STATES PATENTS

| 1,011,808 | Karcher | Dec. 12, 1911 |
| 1,016,586 | Sulliger | Feb. 6, 1912 |
| 1,037,634 | Karcher | Sept. 3, 1912 |
| 1,071,110 | Stover | Aug. 26, 1913 |
| 2,242,369 | Newton | May 20, 1941 |
| 2,503,348 | Miller | Apr. 11, 1950 |
| 2,532,230 | Hupp | Nov. 28, 1950 |